US012128385B2

United States Patent
Ting et al.

(10) Patent No.: US 12,128,385 B2
(45) Date of Patent: Oct. 29, 2024

(54) TERNARY PRUSSIAN BLUE ANALOGUE AND METHOD OF PREPARING THE SAME

(71) Applicant: NATIONAL CHENG KUNG UNIVERSITY, Tainan (TW)

(72) Inventors: Jyh-Ming Ting, Tainan (TW); Kai-Hasiang Yang, Tainan (TW)

(73) Assignee: NATIONAL CHENG KUNG UNIVERSITY, Tainan (TW)

( * ) Notice: Subject to any disclaimer, the term of this patent is extended or adjusted under 35 U.S.C. 154(b) by 0 days.

(21) Appl. No.: 18/058,409

(22) Filed: Nov. 23, 2022

(65) Prior Publication Data

US 2024/0165594 A1 May 23, 2024

(30) Foreign Application Priority Data

Nov. 18, 2022 (TW) .................................. 111144248

(51) Int. Cl.
*B01J 23/04* (2006.01)
*B01J 23/22* (2006.01)
(Continued)

(52) U.S. Cl.
CPC ............. *B01J 23/78* (2013.01); *B01J 35/393* (2024.01); *B01J 35/40* (2024.01); *B01J 35/651* (2024.01); *B01J 2219/00421* (2013.01)

(58) Field of Classification Search
CPC ... B01J 23/04; B01J 23/22; B01J 23/26; B01J 23/745; B01J 23/75; B01J 23/755;
(Continued)

(56) References Cited

U.S. PATENT DOCUMENTS 4,186,112 A * 1/1980 Vogt ...................... C07C 1/0445
502/328
4,237,060 A * 12/1980 Holland ............. C07D 307/937
549/465
(Continued)

FOREIGN PATENT DOCUMENTS

WO WO-2006103212 A1 * 10/2006 ............... B01J 27/26
WO WO-2007043062 A1 * 4/2007 ............... B01J 27/26

OTHER PUBLICATIONS

CN109351324A. Chen C. et al. "Preparing selective ammonium ion sieve useful in treatment of ammonia nitrogen wastewater, comprises e.g. preparing sodium ferrocyanide or potassium ferrocyanide solution and transition metal salt solution, stirring, aging, and separating". Feb. 19, 2019. p. 1-3. (Year: 2019).*

(Continued)

*Primary Examiner* — Cam N. Nguyen
(74) *Attorney, Agent, or Firm* — HSML P. C.

(57) ABSTRACT

Provided are a catalyst and a method of preparing the same. The catalyst has a ternary Prussian blue analogue having transition metals $M^1$, $M^2$, and $M^3$ and represented by the Formula (1) as defined herein, and can be used as a catalyst for oxygen evolution reaction. The method includes separately dissolving transition metal salts, ferrocyanide of alkali metals, and alkali metal salts in different solutions; adding the first two solutions to the third solution; mixing; precipitating; and drying. The ternary Prussian blue analogue catalyst is prepared by a simple and low-energy-consuming co-precipitation method, and the ternary Prussian blue analogue exhibit excellent electrocatalytic property through the synergistic effect of multiple transition metals.

19 Claims, 19 Drawing Sheets

(51) Int. Cl.
*B01J 23/26* (2006.01)
*B01J 23/745* (2006.01)
*B01J 23/75* (2006.01)
*B01J 23/755* (2006.01)
*B01J 23/78* (2006.01)
*B01J 23/847* (2006.01)
*B01J 23/86* (2006.01)
*B01J 27/26* (2006.01)
*B01J 35/30* (2024.01)
*B01J 35/39* (2024.01)
*B01J 35/40* (2024.01)
*B01J 35/64* (2024.01)
*B01J 37/02* (2006.01)
*B01J 37/03* (2006.01)
*B01J 37/04* (2006.01)
*B01J 37/08* (2006.01)

(58) Field of Classification Search
CPC ........ B01J 23/78; B01J 23/8472; B01J 23/86;
B01J 23/862; B01J 23/866; B01J 35/40;
B01J 35/393; B01J 35/651; B01J 37/02;
B01J 37/03; B01J 37/04; B01J 37/08;
B01J 27/26
See application file for complete search history.

(56) References Cited

U.S. PATENT DOCUMENTS

| | | | | |
|---|---|---|---|---|
| 4,237,063 | A * | 12/1980 | Bell | C07C 29/154 502/77 |
| 4,477,589 | A * | 10/1984 | van der Hulst | B01J 27/26 528/412 |
| 4,789,538 | A * | 12/1988 | Cirjak | B01J 23/58 502/328 |
| 5,143,877 | A * | 9/1992 | Geus | B01J 37/12 502/200 |
| 5,148,922 | A * | 9/1992 | Marriott | B03B 13/00 209/489 |
| 5,783,513 | A * | 7/1998 | Combs | B01J 27/26 502/200 |
| 6,627,575 | B2 * | 9/2003 | Kim, II | B01J 27/26 502/200 |
| 6,627,576 | B2 * | 9/2003 | Sugiyama | B01J 27/26 502/175 |
| 6,835,687 | B2 * | 12/2004 | Hofmann | C08G 65/2663 502/154 |
| 6,900,156 | B2 * | 5/2005 | Wehmeyer | B01J 31/2208 502/170 |
| 6,921,737 | B1 * | 7/2005 | Dexheimer | B01J 37/009 423/364 |
| 7,226,887 | B2 * | 6/2007 | Wehmeyer | C08G 65/2663 502/159 |
| 9,562,134 | B2 * | 2/2017 | McDaniel | B01J 31/2208 |
| 11,298,691 | B2 * | 4/2022 | Liu | B01J 35/613 |
| 11,731,996 | B2 * | 8/2023 | Ting | C25B 11/085 556/58 |
| 11,760,656 | B2 * | 9/2023 | Ting | C01G 53/006 429/223 |
| 2016/0152651 | A1 * | 6/2016 | Jung | B01J 37/30 528/405 |
| 2018/0079765 | A1 * | 3/2018 | Jung | B01J 23/75 |
| 2018/0179334 | A1 * | 6/2018 | Luinstra | C08G 63/64 |
| 2021/0154656 | A1 * | 5/2021 | Steelman | B01J 35/40 |

OTHER PUBLICATIONS

CN109351323A. Chen C. et al. "Preparing selective de-ammoniated material useful for treating ammonia nitrogen wastewater, comprises preparing sodium ferrocyanide or potassium ferrocyanide and two transition metal salts, adding into receiving liquid, cleaning and drying". Feb. 19, 2019. p. 1-3. (Year: 2019).*
CN113104863A. Chen C. et al. "Preparing inert transition metal element doped iron-based Prussian blue sodium ion battery anode material comprises e.g. mixing iron salt, inert transition metal, sodium ferrocyanide, ascorbic acid and sodium supplementing agent and aging". Jul. 13, 2021. p. 1-3. (Year: 2021).*
CN112607748A. Chen C. et al. "Synthesizing multi-element Prussian blue cathode material comprises dissolving transition metal salt of nickel salt, cobalt salt and iron salt and sodium citrate in deionized water to form chelating solution A, centrifuging obtained product.". Apr. 6, 2021. p. 1-2. (Year: 2021).*

* cited by examiner

TERNARY PRUSSIAN BLUE ANALOGUE AND METHOD OF PREPARING THE SAME

CROSS-REFERENCE TO RELATED APPLICATIONS

This application claims the benefit of foreign document TAIWAN TW111144248, filed on Nov. 18, 2022, the disclosure of which is hereby incorporated by reference in its entirety.

BACKGROUND

1. Technical Field

The present disclosure relates to a Prussian blue analogue, a ternary Prussian blue analogue catalyst and a preparation method thereof, and especially relates to a ternary Prussian blue analogue, which can be synthesized under normal temperature and normal pressure conditions, and can be used as a catalyst for oxygen evolution reaction.

2. Description of Related Art

Reducing $CO_2$ emissions and saving energy have become widely discussed. In the past, most of the widely used energy sources came from fossil fuels, such as natural gas, coal and oil. However, the large use of fossil fuels not only reduced the limited petrochemical resources, but also emitted a large amount of greenhouse gases including carbon dioxide, methane, and nitrous oxide. Therefore, in order to gradually slow down the greenhouse effect to protect the earth from the drastic ecological changes and catastrophes caused by abnormal climate change, the world is actively developing new energy sources that can replace traditional fossil fuels. Currently, commonly used alternative energy sources include solar energy, wind power, water power, geothermal power, biofuel, or green energy generated by developing novel processes, such as hydrogen energy. Since the source of green energy is taken from nature, it can be used immediately, continuously and repeatedly, and hence green energy is a kind of clean energy with low cost, low pollution and high economic value.

At present, the industry is actively developing equipment and methods that can produce hydrogen energy in large quantities, because hydrogen energy has excellent characteristics such as abundant reserves, cleanliness and pollution-free, high efficiency, and is a very promising green energy. The methods used in the industry include methanol reforming hydrogen production, natural gas stream hydrogen production, water gas hydrogen production, and water electrolysis hydrogen production, and only water electrolysis hydrogen production among these methods can produce hydrogen does not require the use of fossil fuels. Therefore, the present disclosure focus on the technology of water electrolysis hydrogen production.

There are two main half-reactions in water electrolysis, one is the oxygen evolution reaction (OER) that the anode produces oxygen and the hydrogen evolution reaction (HER) that the cathode produces hydrogen, wherein water electrolysis has slow kinetics due to the high activation energy limitation of the O—O bond generated in the final step of the anodic reaction.

The activation threshold of water electrolysis is mainly explained by thermodynamic theory. The redox reaction potential difference of water splitting is 1.23V, which means that 1.23V needs to be applied to make the reaction occur, and this high potential is caused by the anodic reaction. The anodic reaction includes multiproton-coupled electron-transfer steps, as expressed by the following reaction formulas (* is the active site):

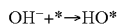
$OH^- + * \rightarrow HO*$

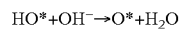
$HO* + OH^- \rightarrow O* + H_2O$

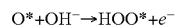
$O* + OH^- \rightarrow HOO* + e^-$

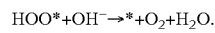
$HOO* + OH^- \rightarrow * + O_2 + H_2O.$

Therefore, catalysts that can reduce the activation energy and increase the reaction rate are needed. In the past, electrocatalysts for oxygen evolution reactions mostly used iridium dioxide ($IrO_2$) or ruthenium dioxide ($RuO_2$) containing precious metals. Although they have good catalytic effects, they are not stable enough at high anode potential and are expensive. In addition, there have been reports of using transition metals as catalysts, such as nitrides, phosphides, oxides, sulfides and hydroxides including transition metals. Although transition metal catalysts are relatively easy to obtain, inexpensive and highly efficient, however, the current methods commonly used to prepare transition metal catalysts (such as the hydrothermal method and electroplating method) are not only very complicated in the manufacturing process but also necessary to use the means requiring additional energy consumption, such as high temperature and high pressure, which runs counter to the goal of energy conservation and sustainable development. Furthermore, the electrocatalytic performance of the catalyst needs to be continuously improved to meet the ever-expanding demand.

SUMMARY

In light of the foregoing, the present disclosure provides a novel catalyst comprising a ternary Prussian blue analogue represented by the following formula (1):

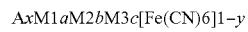
$A_xM1_aM2_bM3_c[Fe(CN)6]_{1-y}$   Formula (1)

wherein A is an alkali metal;
each of M1, M2 and M3 is independently a transition metal, and M1, M2 and M3 are different from each other;
$0 < x \leq 2$;
$0 < y \leq 1$; and
a, b, and c are $>0$, and $a+b+c=1$.

In a specific embodiment, the A is selected from Li, Na, K, Rb, Cs and Fr; in other specific embodiment, A is Li, Na or K; in another embodiment, A is Na or K; in yet another embodiment, A is Na.

In a specific embodiment, each of the $M^1$, $M^2$, and $M^3$ of the ternary Prussian blue analogue is independently selected from Sc, Ti, V, Cr, Mn, Fe, Co, Ni, Cu, Zn, Y, Zr, Nb, Mo, Tc, Ru, Rh, Pd, Ag and Cd; in other embodiment, each of the $M^1$, $M^2$, and $M^3$ of the ternary Prussian blue analogue is independently selected from Fe, V, Cr, Co and Ni; in another embodiment, the $M^1$, $M^2$ and $M^3$ of the ternary Prussian blue analogue are a combination of Fe, Co and Ni; a combination of Fe, Cr and Ni; or a combination of Fe, V and Ni.

In a specific embodiment, the mole ratio of the $M^1:M^2:M^3$ of the ternary Prussian blue analogue is 1:0.2:1 to 1:5:1; in other specific embodiment, the mole ratio of $M^1:M^2:M^3$ of the ternary Prussian blue analogue is 1:1:0.2 to 1:1:5; in another specific embodiment, the mole ratio of $M^1:M^2:M^3$ of the ternary Prussian blue analogue is 0.2:1:1 to 5:1:1; in yet another specific embodiment, the mole ratio of the $M^1:M^2:M^3$ of the ternary Prussian blue analogue is 1:1:1.

In a specific embodiment, the catalyst is granular and has a particle size of 5 to 150 nm. In other specific embodiment, the catalyst has a particle size of 5 to 100 nm, a particle size of 5 to 80 nm, or a particle size of 10 to 80 nm. For example, a catalyst has a particle size of 5, 6, 7, 8, 9, 10, 15, 20, 25, 30, 35, 40, 45, 50, 55, 60, 65, 70, 75, 80, 85, 90, 95, 100, 110, 120, 130, 140, 150 nm. Here, the particle size can refer to the average particle size, and also can refer to the distribution particle size of each particle.

In a specific embodiment, the catalyst is a crystalline form of the cubic crystal system.

In a specific embodiment, the catalyst is used as an oxygen evolution reaction catalyst, that is, the present disclosure also provides an oxygen evolution reaction catalyst, which comprises the ternary Prussian blue analogue.

In a specific embodiment, the catalyst in the oxygen evolution reaction has an overpotential of 250 mV or less or has an overpotential of 240 mV or less at a current density of 10 mA/cm$^2$. For example, the catalyst has an overpotential of 250, 249, 248, 247, 246, 245, 244, 243, 242, 241, 240, 239, 238, 237, 236, 235, 234, 233, 232, 231, 230 mV, or within the range defined by said overpotential value, such as 230 to 250 mV at a current density of 10 mA/cm$^2$.

In a specific embodiment, the catalyst in an oxygen evolution reaction has an overpotential of 300 mV or less or has an overpotential of 290 mV or less at a current density of 100 mA/cm$^2$. For example, the catalyst has an overpotential of 300, 299, 298, 297, 296, 295, 294, 293, 292, 291, 290, 289, 288, 287, 286, 285, 284, 283, 282, 281, 280 mV, or within the range defined by said overpotential value, such as 280 to 300 mV at a current density of 100 mA/cm$^2$.

In a specific embodiment, the catalyst in the oxygen evolution reaction has a durability of 75 hours or more at a current density of 10 mA/cm$^2$.

In a specific embodiment, the catalyst in the oxygen evolution reaction has a durability of 75 hours or more at a current density of 100 mA/cm$^2$.

In a specific embodiment, the catalyst in the oxygen evolution reaction has a Tafel slope of 45 mV/dec ore less. For example, the Tafel slope of the catalyst in the oxygen evolution reaction are 45, 45.00, 44.75, 44.50, 44.25, 44.00, 43.77, 43.75, 43.50, 43.25, 43.00 mV/dec, or within the range defined by said Tafel slope value, such as 43 to 45 mV/dec.

In a specific embodiment, the catalyst in the oxygen evolution reaction has an electrochemical active surface area (ECSA) of 1.18 mF/cm$^2$ or more. This shows that in addition to being significantly better than the conventional binary FeCo-PBA in terms of durability, the catalyst of the present disclosure achieves the same level of ECSA as the conventional binary Prussian blue analogue catalyst (FeCo-PBA is 1.12 mF/cm$^2$, such as shown in the following examples of the present disclosure), and also slightly improves ECSA. In other embodiment, the catalyst of the present disclosure in the oxygen evolution reaction has an ECSA of 1.18 to 1.25 mF/cm$^2$. For example, in the oxygen evolution reaction, the ECSA is 1.18, 1.19, 1.20, 1.21, 1.22, 1.23, 1.24, 1.25 mF/cm$^2$, or within the range of the ECSA values, such as 1.18 to 1.25 mF/cm$^2$.

The present disclosure further provides a method for preparing a catalyst, the catalyst system comprises the ternary Prussian blue analogue, and the method comprises the following steps:
  (a) dissolving the sulfate of each the transition metals in water to form a first solution;
  (b) dissolving ferrocyanide of the alkali metal in water to form a second solution;
  (c) dissolving an alkali metal salt and a dispersant in water to form a third solution;
  (d) adding the first solution and the second solution to the third solution, and then stirring and mixing;
  (e) standing for precipitation; and
  (f) drying the precipitate to obtain the catalyst.

In a specific embodiment, the alkali metal salt is selected from a group consisting of sodium chloride, potassium chloride, lithium chloride, sodium bromide, potassium bromide, and lithium bromide. In a specific embodiment, the alkali metal salt is sodium chloride.

The dispersant is used to assist in the formation of nanomaterials, and in a specific embodiment, the aqueous dispersant is polyvinylpyrrolidone (PVP).

In a specific embodiment, each of the first solution and the second solution is added to the third solution in batches, for example, each of the first solution and the second solution is added dropwise to the third solution.

In a specific embodiment, when the standing for precipitation of the step (e) is performed, the third solution to which the first solution and the second solution are added must be shielded from light.

In a specific embodiment, the standing for precipitation of the step (e) is performed for at least 6 hours, at least 8 hours, at least 10 hours, at least 12 hours, at least 16 hours, at least 18 hours, at least 20 hours, or at least 24 hours.

In a specific embodiment, each of the first solutions of step (a) has the same number of moles of each transition metal.

In a specific embodiment, the step (a) comprises stirring to promote the dissolution of sulfate of the transition metal.

In a specific embodiment, the standing for precipitation of step (e) forms a co-precipitate.

In a specific embodiment, the step (a) to step (e) are performed at 15 to 25° C.

In a specific embodiment, the method further comprises a step (g), which between step (e) and step (f), centrifuges the precipitate with water and alcohol to remove impurities.

The present disclosure further provides a method for oxygen evolution reaction (OER), comprising the following Formula (2):

Anodic OER Reaction (Oxygen Evolution Reaction):

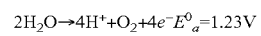

Cathode HER Reaction (Hydrogen Evolution Reaction):

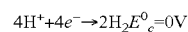

Overall Reaction:

                                    Formula (2)

wherein $E^0_a$ is the anode standard reduction potential, $E^0_c$ is the cathode standard reduction potential, and $E^0_{overall}$ is the overall potential, wherein the oxygen evolution reaction is carried out in the presence of the catalyst of the present disclosure, which comprises the ternary Prussian blue analogue.

The present disclosure provides a novel catalyst specifically comprising a ternary Prussian blue analogue, and can be used as an electrocatalyst for oxygen evolution reaction to enhance the efficiency of water electrolysis. The ternary Prussian blue analogue of the present disclosure is synthesized by adding aqueous solutions of three transition metal sulfates to an aqueous solution of ferrocyanide of alkali metals and undergoing co-precipitation. With the synergistic effect of the three transition metals in the ternary Prussian blue analogue, low overpotential and high durability can be achieved, and excellent catalytic effect can be maintained even at high current densities.

DETAILED DESCRIPTIONS

Figure 1:
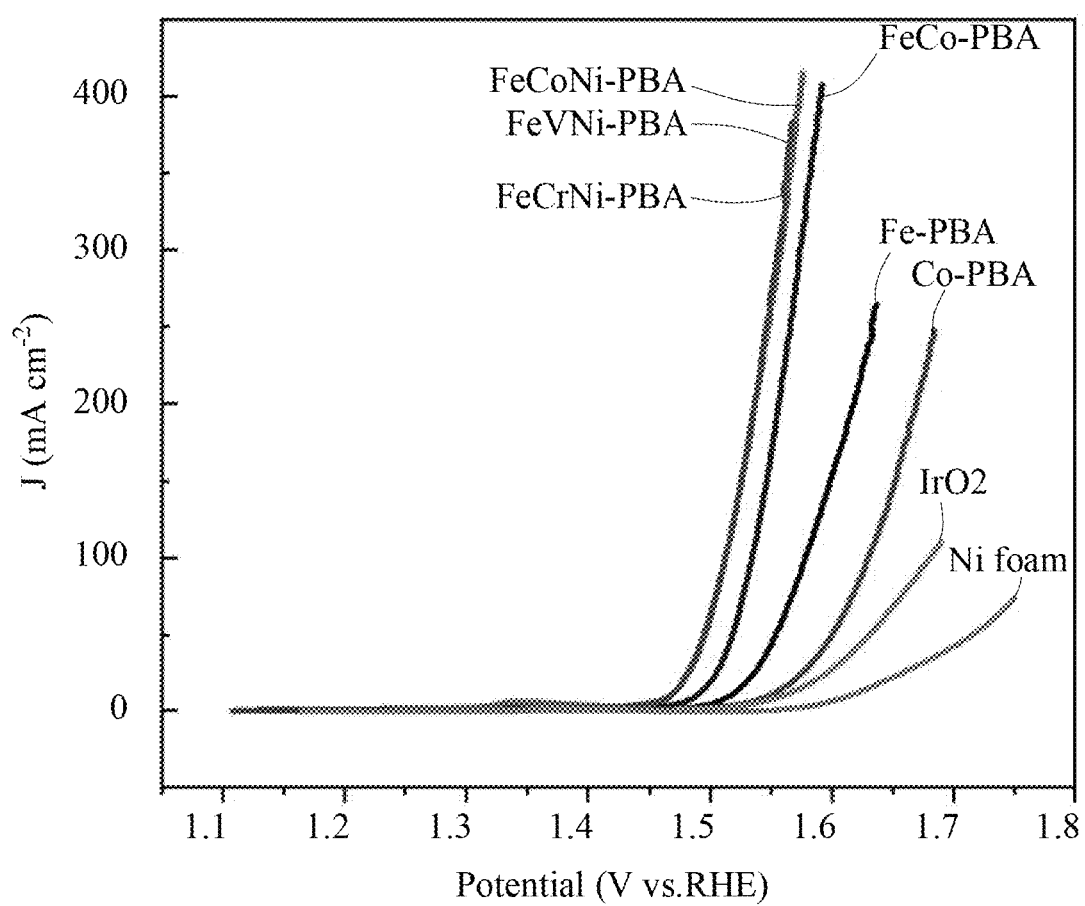
FIG. 1 is a linear sweep voltammetry (LSV) graph of the ternary Prussian blue analogue of the present disclosure.

The following describes the embodiment of the present disclosure by specific embodiments, and those with general knowledge in the related technical field may easily understand the advantages and efficacy of the present disclosure from the content disclosed in this specification. The present disclosure may also be implemented or applied by other different embodiments, and the details in this specification may also be based on different views and applications, and may be modified and changed without deviating from the ideas disclosed in the present disclosure. Meanwhile, all ranges and values in this article are inclusive and combinable. Any numeric value or point that falls within the range described in this article, such as any integer can be taken as a minimum or maximum value to derive the lower range and so on.

It should be understood that the structure, proportion, and size of the drawings attached to this specification are only used to cooperate with the content revealed in the specification for those familiar with this technique to understand and read, and are not used to limit the restrictions on the implementation of this disclosure, so they have no technical substantive significance, and any structural modification, change of proportion relationship or adjustment of size, without affecting the effect of this disclosure and the purpose that can be achieved, should still fall within the scope of the technical content revealed in this disclosure.

In the present specification, unless otherwise specified, the unit of quantity, mole(s), is obtained via mass/atomic (molecular) weight (g/Mw); volume is measured in milliliters (ml); room temperature or normal temperature refers to 15 to 25° C.

The general formula of a Prussian blue analogue (PBA) is as follows:

$$A_xM[M'(CN)6]1-y \qquad \text{Formula (3)}$$

wherein A is an alkali metal, M and M' are transition metals, y is a vacancy, 0<x≤2, 0<y≤1. PBA has two metal centers, one of which is M, which can be bivalent or trivalent and coordinate with six surrounding nitrogen atoms; the other is M', which can be bivalent or trivalent and coordinate with six surrounding carbon atoms, and the octahedrons formed by these two metal centers are stacked to form a three-dimensional open structure. The A fills in the gap of the PBA structure. The other often-mentioned two are PBA defects and water. Structural defects of PBA are vacancies of M'(CN)6, and water can also exist in the PBA structure in three forms: adsorbed water (adsorbed on the surface of the PBA structure), interstitial water (filled the interstitial sites in the PBA structure), coordinated water (occupying vacancies and coordinated with the metal center M).

The present disclosure specifically makes the metal center M be three different transition metals, thus producing a ternary Prussian blue analogue. Through the synergistic effect of the three transition metals, low overpotential and high durability can be achieved, and excellent electrocatalytic effect can be maintained even at high current densities.

The following is a detailed description of the present disclosure by specific examples, but the scope of the present disclosure is not limited to such specific examples.

Example 1: Preparation of a Ternary Prussian Blue Analogue

The ternary Prussian blue analogue disclosed herein were synthesized by a co-precipitation method. First, 5 mmols of sulfate of transition metals: ferrous sulfate $FeSO_4$, cobalt sulfate $CoSO_4$, nickel sulfate $NiSO_4$, vanadium (II) sulfate $VSO_4$, and chromium (II) sulfate $CrSO_4$ were each separately dissolved in 25 mL of deionized water (DI water) to form the first solution. Similarly, 5 mmols of sodium ferrocyanide $Na_4Fe(CN)_6$ was dissolved in 25 ml of deionized water to form the second solution. In addition, 50 mmols of sodium chloride and 4 grams of polyvinylpyrrolidone (PVP) were dissolved in 100 ml of deionized water to form the third solution.

The first to third solutions were stirred for 40 minutes to completely dissolve the powder crystals respectively. After that, three kinds were selected from the first solution, the first and second solutions were slowly dropped into the third solution at the same time, and the stirring was continued for 3 hours. Next, the container was shielded with aluminum foil to block light from entering the mixed solution, stand for precipitation for 18 hours, and after the liquid layer and co-precipitate appear, remove the co-precipitate and centrifuge twice with water and alcohol to remove impurities. Place in a vacuum oven and dry overnight at 60° C. to obtain the ternary Prussian blue analogue powder as shown in Table 1.

TABLE 1

Selection of the first solution and the formation of ternary Prussian blue analogues

| First solution | | | | | |
|---|---|---|---|---|---|
| Fe | Co | Ni | V | Cr | Produced ternary Prussian blue analogue |
| ● | ● | ● |   |   | FeCoNi-PBA |
| ● |   | ● |   | ● | FeCrNi-PBA |
| ● |   | ● | ● |   | FeVNi-PBA |

Preparation of Working Electrode and Construction of Electrochemical Measurement Equipment Nickel foam substrate: Nickel foam is easily oxidized in air to form nickel oxide on the surface, so it needs to be pickled to remove surface oxides before synthesis. First, the nickel foam was cut into 2×1 cm² size and soaked in 3M hydrochloric acid (HCl) for 5 minutes, then placed in an ultrasonic oscillation tank for 15 minutes and 4 times to remove nickel oxide on the surface, of which the first two times in the oscillation tank are deionized water, and the last two times are alcohol. The nickel foam was then dried with nitrogen air and placed in a vacuum oven at 60 C for drying.

5 mg of ternary Prussian blue analogue catalyst was added to a solution containing 340 μl of deionized water, 150 μl of ethanol, and 40 μl of Nafion (adhesive), and shaken for 1 hour to ensure that the powder was evenly dispersed in the solution. 150 μl of this solution was evenly dropped on the cleaned nickel foam substrate, the range of treatment was 1×1 cm², and the solution was evenly distributed on two surfaces and side edges of the nickel foam substrate. The sealing-tape was wrapped around the remaining 1×1 cm² part that was not coated with the ternary Prussian blue analogue catalyst, and the copper tape was used as a bridge for current conduction to connect the working electrode with the electrochemical measuring device.

The present disclosure used Autolab Electrochemistry Workstation (Muti Autolab/M204) with a built-in electrochemical impedance spectroscopy (EIS) analyzer for electrochemical property analysis. The standard tripolar electrolyzer measurement system was used, which contains:
 the working electrode: the ternary Prussian blue analogue catalyst formed on the nickel foam substrate;
 the counter electrode: carbon rod;
 the reference electrode: Ag/AgCl; and
 1M potassium hydroxide (KOH) as an electrolyte solution.

Linear sweep voltammetry (LSV) was carried out at a scan rate of 5 mV/s to obtain the polarization curve. Conversion of the potential ($E_{Ag/AgCl}$) and reversible hydrogen electrode electromotive force ($E_{RHE}$) was in accordance with the formula $E_{RHE}=E_{Ag/AgCl}+0.1976+0.059 \times pH$.

Example 2: Current Density-Potentiometric Diagram and Overpotential

Please refer to FIG. 1, which is the current density-potential graph obtained by using the ternary Prussian blue analogues FeCoNi-PBA, FeCrNi-PBA and FeVNi-PBA of the present disclosure as oxygen evolution reaction catalysts, and by using other comparative examples: the unary Prussian blue analogues Fe-PBA and Co-PBA as the catalyst, binary Prussian blue analogue FeCo-PBA as the catalyst, no catalyst (pure nickel foam), and $IrO_2$ as the catalyst through linear sweep voltammetry (LSV).

The ternary Prussian blue analogues FeCoNi-PBA, FeCrNi-PBA, and FeVNi-PBA of the present disclosure all exhibited fairly good electrocatalytic ability, and the required current density can be obtained at a lower applied potential. Moreover, from the results of unary, binary and ternary Prussian blue analogues, it can be concluded that the electrocatalytic ability increases significantly with the type of transition element.

Figure 2:
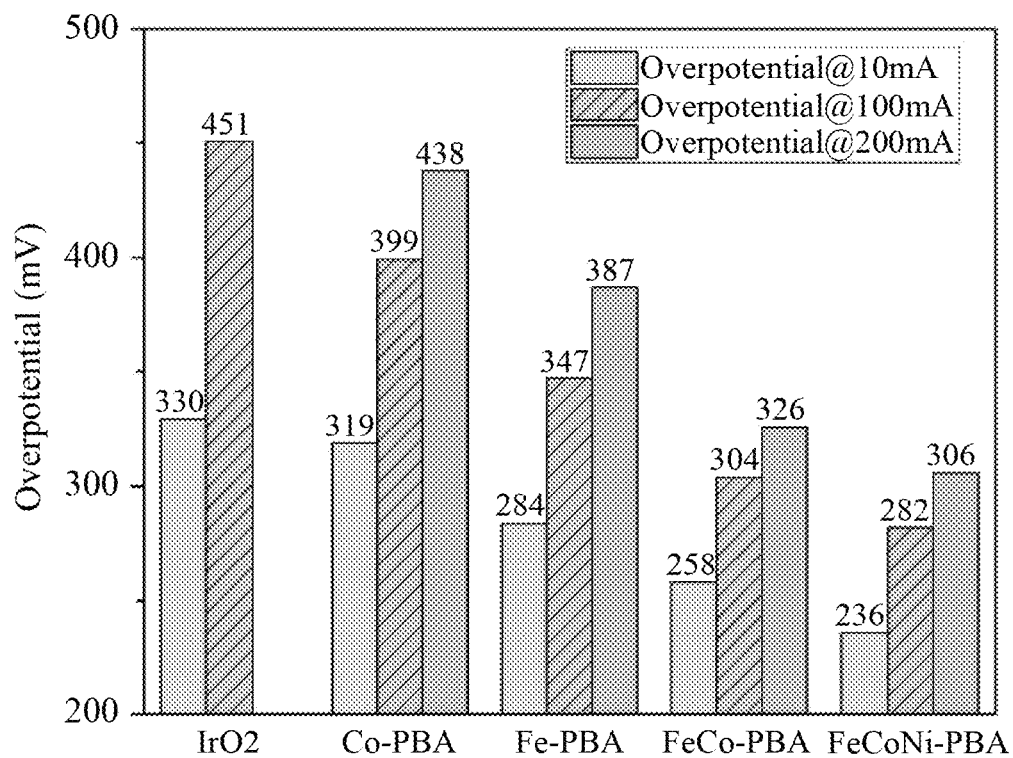
FIG. 2 is a histogram comparison of overpotentials of all samples of the present disclosure.

Referring to Table 2 and FIG. 2 below, a gradual decrease in the required overpotential can be observed from the unary to the ternary Prussian blue analogue by linear sweep voltammetry, representing an increase in electrocatalytic ability. Moreover, the ternary Prussian blue analogue of the present disclosure had an oxygen evolution reaction overpotential of only 236 to 237 mV at a current density of 10 mA/cm²; had an oxygen evolution reaction overpotential of only 282 mV at a current density of 100 mA/cm²; had an oxygen evolution reaction overpotential of only 306 mV at a current density of 200 mA/cm², showing that the electrocatalytic effect was excellent.

TABLE 2

Comparison of overpotentials at different current densities

| | The current density of the oxygen evolution reaction OER | | | | |
|---|---|---|---|---|---|
| Type of catalyst | 10 mA/cm² | 100 mA/cm² | 200 mA/cm² | 300 mA/cm² | 400 mA/cm² |
| Comparative example: Fe-PBA | 284 mV | 347 mV | 387 mV | — | — |
| Comparative example: Co-PBA | 319 mV | 399 mV | 438 mV | — | — |
| Comparative example: FeCo-PBA | 258 mV | 304 mV | 326 mV | 343 mV | 361 mV |
| FeCoNi-PBA | 236 mV | 282 mV | 306 mV | 325 mV | 344 mV |
| FeCrNi-PBA | 237 mV | 282 mV | 306 mV | 328 mV | — |
| FeVNi-PBA | 237 mV | 282 mV | 306 mV | 325 mV | — |

Example 3: Tafel Slope

Figure 3:
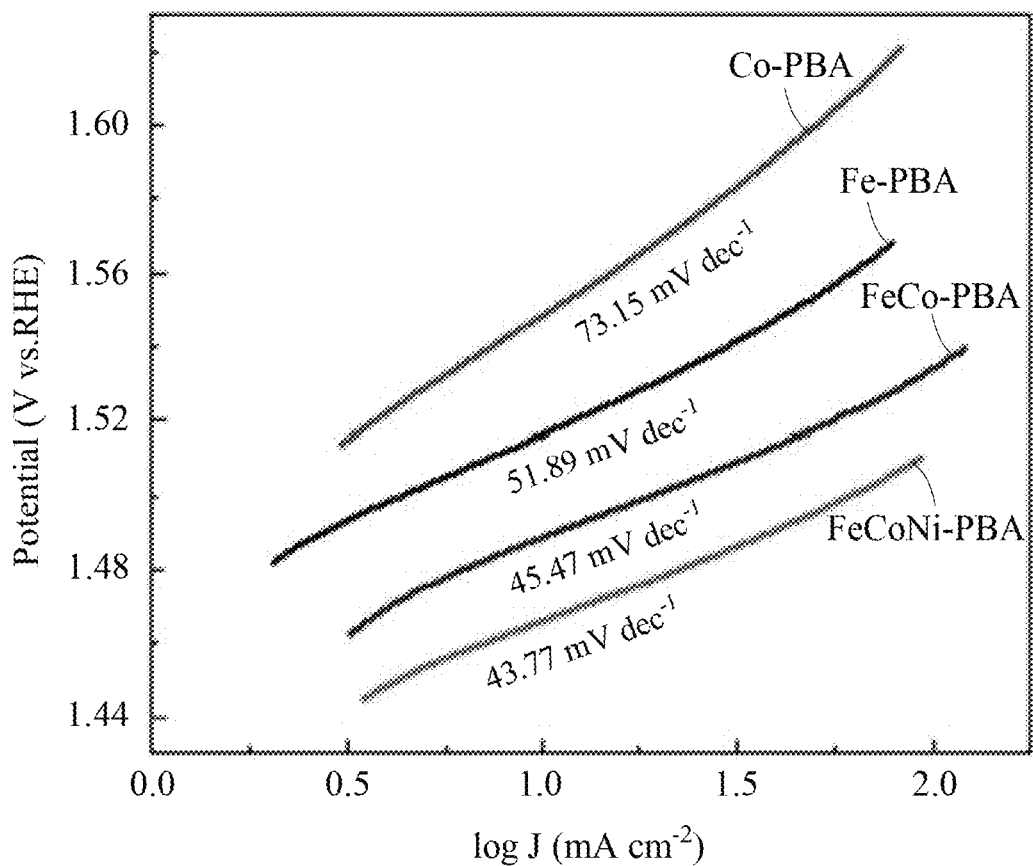
FIG. 3 is a graph showing the Tafel slope of unary to ternary Prussian blue analogues of the present disclosure.

Please referring to FIG. 3 and Table 3, for the calculation of the Tafel slope, the ternary Prussian blue analogue FeCoNi-PBA of the present disclosure showed the lowest slope, indicating that its oxygen evolution reaction (OER) rate was the best one, and only had 236 millivolts (mV) overpotential at a current density of 10 mA/cm².

TABLE 3

Comparison of Tafel slopes

| Type of catalyst | Overpotential at 10 mA/cm² (mV) | Tafel slope (mV/dec) |
|---|---|---|
| Comparitive example: Fe-PBA | 284 | 51.89 |
| Comparitive example: Co-PBA | 319 | 73.15 |
| Comparitive example: FeCo-PBA | 258 | 45.47 |
| FeCoNi-PBA | 236 | 43.77 |

Example 4: Electrochemical Impedance Spectroscopy (EIS) and Electrochemical Active Surface Area (ECSA)

Figure 4A:
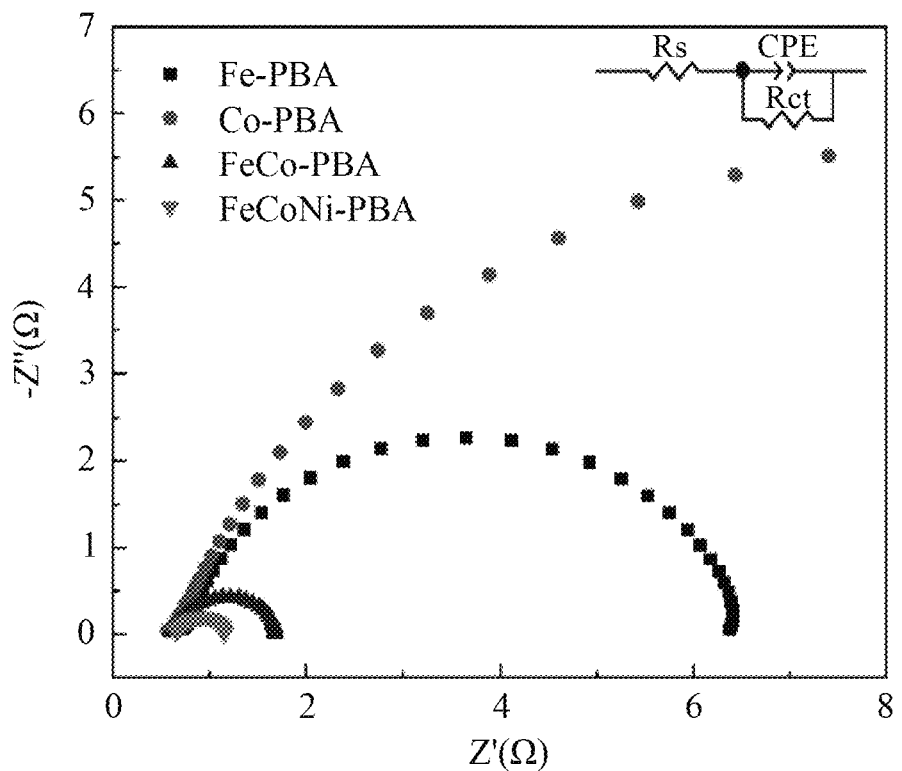
FIG. 4A is an electrochemical impedance spectrum (EIS) of unary to ternary Prussian blue analogues.

Firstly, the electrochemical impedance spectra were measured at the electrochemical workstation. A weak alternating current potential was applied, the disturbance was generated through the small vibration of the alternating current sine wave, and the impedance spectra were depicted by measuring the changes in impedance with the frequency change and in the same frequency range. The main common resistance parameters are solution resistance ($R_s$), charge transfer resistance ($R_{ct}$), wherein $R_s$ is related to the resistance of the electrolyte between the working electrode and the reference electrode, and $R_{ct}$ is the impedance of the interface charge transfer between the electrode and the electrolyte. The electrochemical impedance spectra were shown in FIG. 4A, and the ternary Prussian blue analogue of the present disclosure had a lower charge transfer resistance than the unary and binary Prussian blue analogues.

Figure 4B:
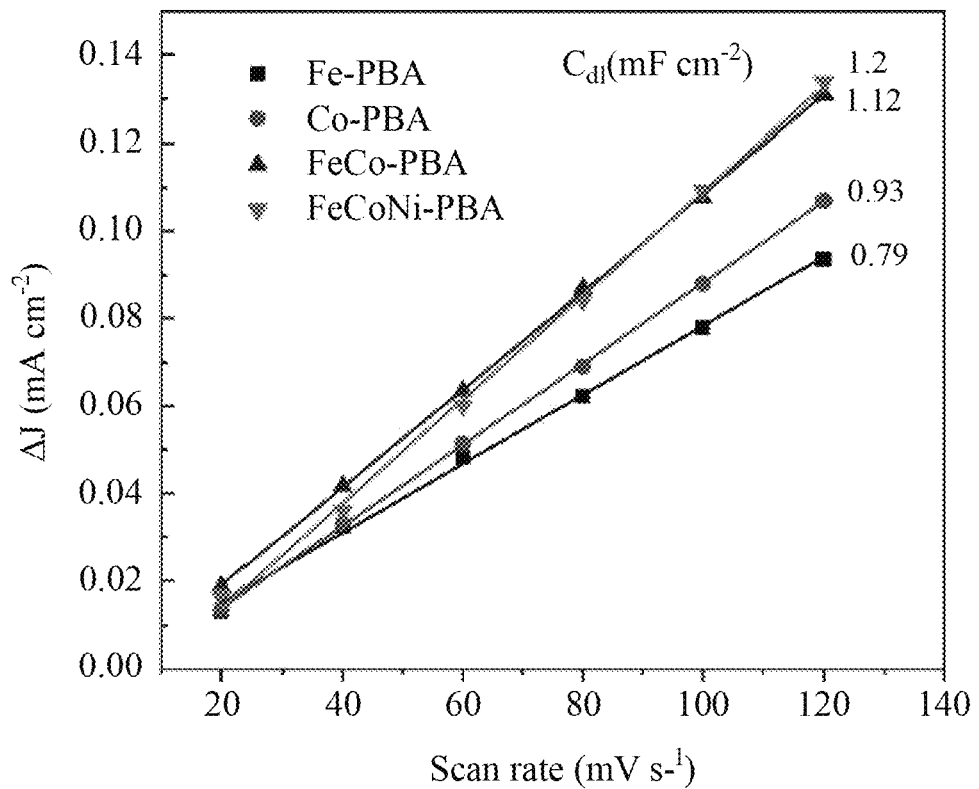
FIG. 4B is an electrochemical active surface area (ECSA) graph of unary to ternary Prussian blue analogues.

Secondly, the electrochemical active surface area was used as a parameter to evaluate the number of active sites. The surface morphology, structural defects, porosity of the catalyst . . . etc. can effectively promote the exposure of more active sites. To understand the electrochemical active surface area of the catalyst, cyclic voltammetry (CV) was performed at different scan rates in the Faraday region, and the double-layer capacitance value ($C_{dl}$) was obtained by depicting the CV curve. The ECSA value was further calculated from the following formula: ECSA=$C_{dl}/C_s$, wherein $C_s$ is the specific capacitance value. The solution environment affects the specific capacitance value, and 0.04 mF/cm² is usually used as the capacitance value in an alkaline environment. From FIG. 4B, the ternary Prussian blue analogue of the present disclosure had a higher active surface area than the unary and binary Prussian blue analogues.

Example 5: Durability Test

Figure 5A:
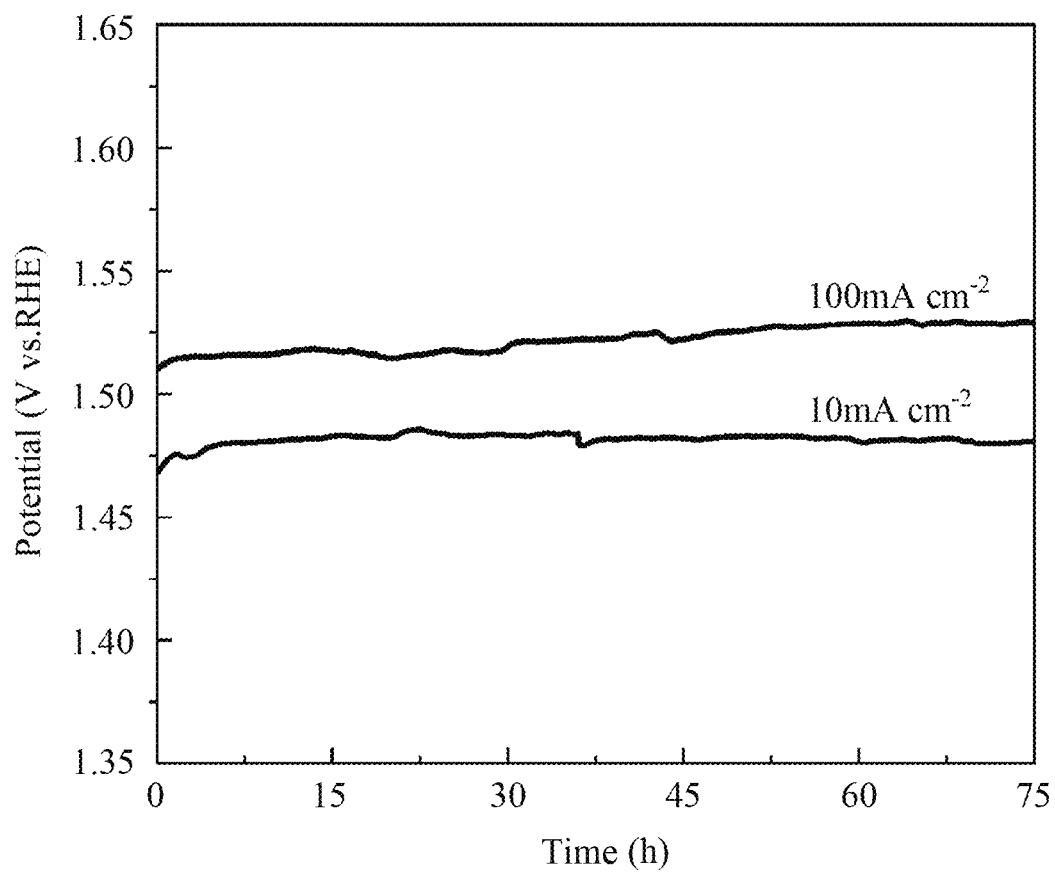
FIG. 5A is a durability test graph of the ternary Prussian blue analogues of the present disclosure under different current densities.
Figure 5B:
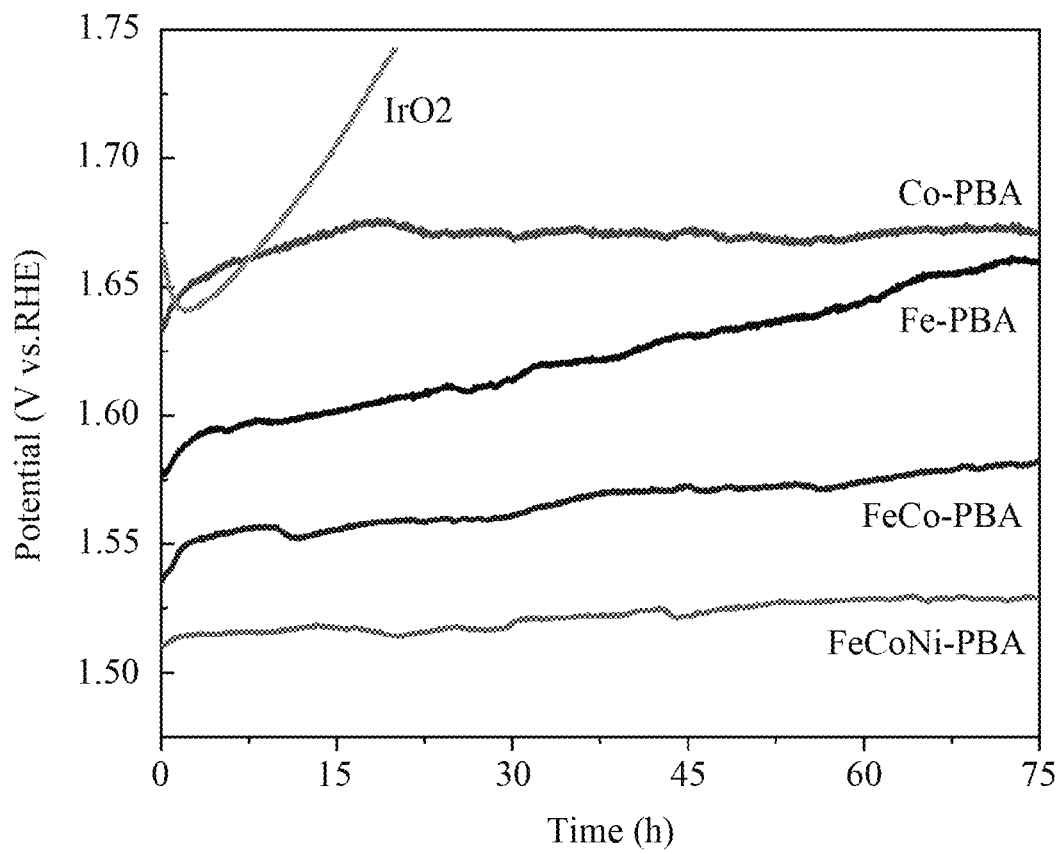
FIG. 5B is a durability test comparison graph of unary to ternary Prussian blue analogues at a current density of 100 mA/cm$^2$.

Electrochemical durability is also an important parameter in electrocatalytic performance. The present disclosure tested durability at a continuous current density of 10 mA/cm² and 100 mA/cm², and the results were shown in FIG. 5A and FIG. 5B. According to FIG. 5A, the ternary Prussian blue analogue FeCoNi-PBA of the present disclosure at current densities of 10 mA/cm² and 100 mA/cm² both exhibited excellent electrocatalytic ability within 75 hours, with only 0.7% and 1.25% attenuation, respectively, thus showing no significant deterioration trend. FIG. 5B showed a comparison of the durability of the ternary Prussian blue analogue of the present disclosure and unary and binary Prussian blue analogues and IrO₂ as the comparative examples at current density of 100 mA/cm², and it can be observed that the electrocatalytic ability of IrO₂ showed very significant decay in a short time, followed by the unary Prussian blue analogue Fe-PBA. A slightly increase in applied potential within 60 hours was shown in the binary Prussian blue analogue and the required applied potential in the durability test was higher than that of the ternary Prussian blue analogue. The potential of the ternary Prussian blue analogue was very stable over 75 hours compared with the other groups, showing excellent durability.

Example 6: Elemental Analysis and Thermogravimetric Analysis (TGA)

Figure 6:
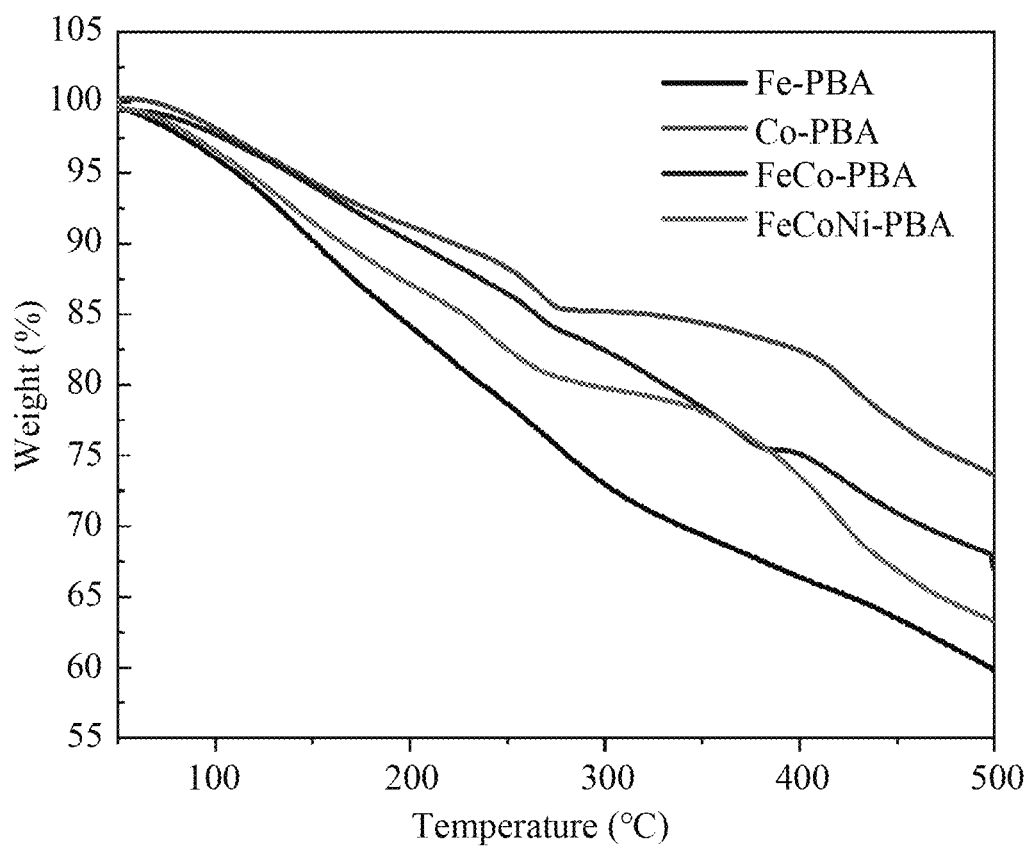
FIG. 6 is a thermogravimetric analysis (TGA) graph of unary to ternary Prussian blue analogues.

Please refer to Table 4 below, which is the results of elemental analysis of the ternary Prussian blue analogue FeCoNi-PBA of the present disclosure, and the unary and binary Prussian blue analogues as comparative examples by induced couple plasma (ICP). Table 4 showed the atomic % results in terms of the two metal centers M and M' of the Prussian blue analogue (PBA). The data revealed that the element percentages of Fe and Co gradually decreases from unary Prussian blue analogue to ternary Prussian blue analogue, representing the successful incorporation of different metal elements. Next, the results of Table 4 below can be combined with the weight percentages of C and N shown in Table 5 below and the thermogravimetric analysis shown in FIG. 6 (the water content can be obtained) to calculate and analyze, and then the Fe(CN)₆ vacancy ratio contained in the Prussian blue analogues can be obtained: the vacancy ratio of in Fe-PBA was 18%, in Co-PBA was 25%, in FeCo-PBA was 31%, in the ternary Prussian blue analogue FeCoNi-PBA of the present disclosure was 28%. From this point of view, part of position of the metal center M occupied by the Co and Ni increased the Fe(CN)₆ vacancies in the structure. In addition, based on these results, the structural formula of the ternary Prussian blue analogue FeCoNi-PBA of the present disclosure was:

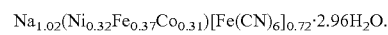

$Na_{1.02}(Ni_{0.32}Fe_{0.37}Co_{0.31})[Fe(CN)_6]_{0.72} \cdot 2.96H_2O$.

TABLE 4

Atomic percentages of Fe, Co, and Ni (atomic %)

| Type of catalyst | Fe | Co | Ni | Na/(Fe + Co + Ni + Na) |
|---|---|---|---|---|
| Comparitive example: Fe-PBA | 100% | — | — | 0.33 |
| Comparitive example: Co-PBA | 47% | 53% | — | 0.42 |
| Comparitive example: FeCo-PBA | 72% | 28% | — | 0.41 |
| FeCoNi-PBA | 64% | 18% | 18% | 0.37 |

TABLE 5

Weight percentages of N and C (wt %)

| Type of catalyst | N | C |
|---|---|---|
| Comparitive example: Fe-PBA | 19.4% | 18.3% |
| Comparitive example: Co-PBA | 19.98% | 18.9% |
| Comparitive example: FeCo-PBA | 19.41% | 18.1% |
| FeCoNi-PBA | 19.56% | 18.5% |

Example 7: X-Ray Diffraction (XRD) Crystal Structure Analysis

Figure 7:
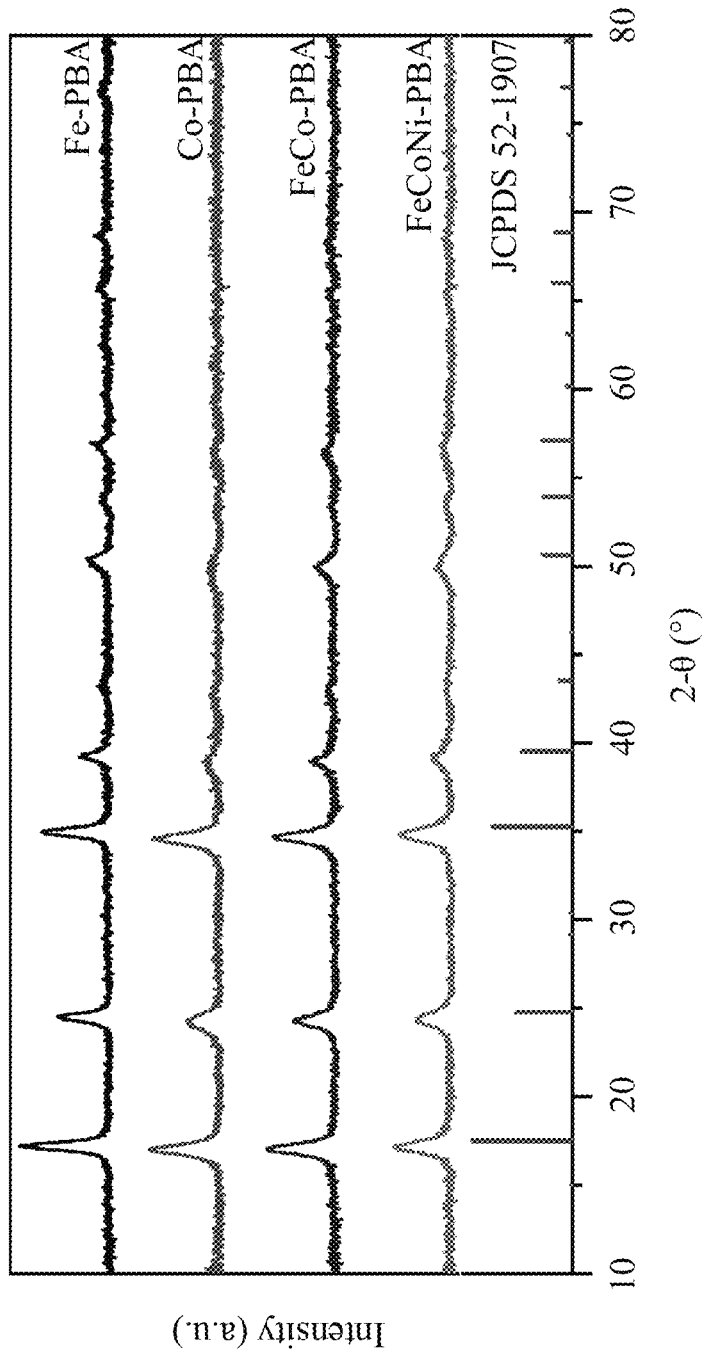
FIG. 7 is a X-ray diffraction (XRD) pattern of unary to ternary Prussian blue analogues.

An X-ray diffractometer (model: D8 DISCOVER with GADDS (Brucker AXS Gmbh, Karlsruhe, Germany)) was used to determine the crystal structure of the ternary Prussian blue analogue FeCoNi-PBA of the present disclosure, and the unary and binary Prussian blue analogues as comparative examples. As shown in FIG. 7, all samples exhibited three high-intensity characteristic peaks at approximately 18°, 24°, and 36°, respectively, and the entire XRD pattern was similar to that of Prussian blue (JCPDS 52-1907), that is, it had the same or very similar structure to Prussian blue: it belonged to the cubic crystal system and Fm-3m space group. Furthermore, compared with each Prussian blue analogue, part of position of the metal center M occupied by Co and Ni affected the symmetry of the bonding and the crystal structure, thus reducing the crystallinity.

Example 8: Analysis of Fourier Transform Infrared Spectroscopy (FTIR)

Figure 8:
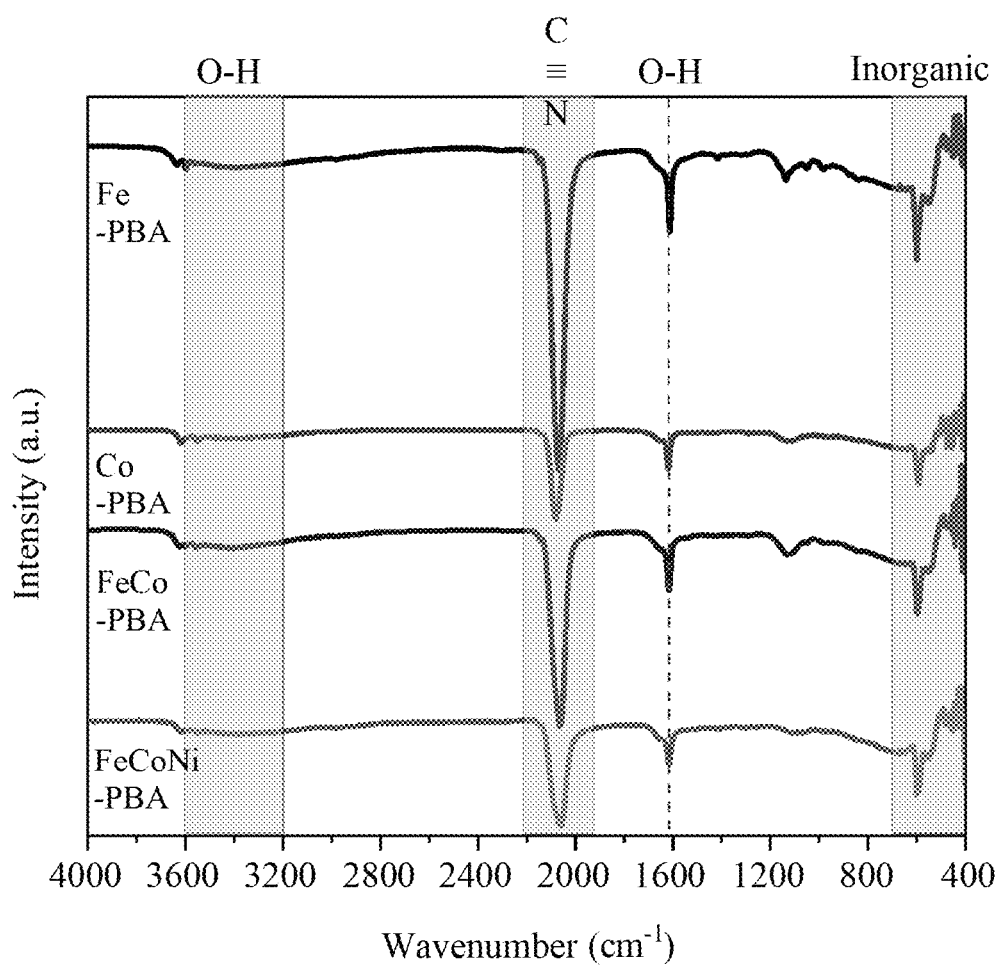
FIG. 8 is a Fourier transform infrared (FTIR) spectrum of unary to ternary Prussian blue analogues.
Figure 9:
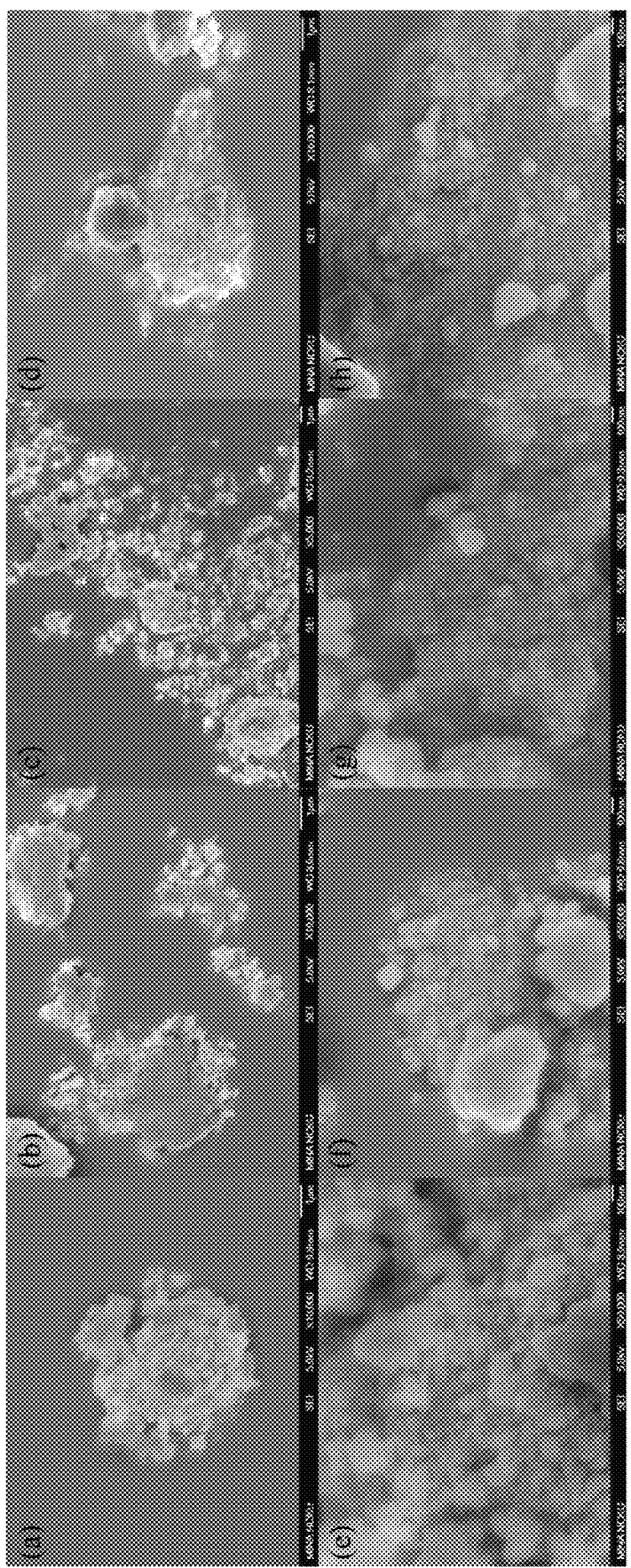
FIGS. 9(a) to (h) are photographs of a scanning electron microscope (SEM) of unary to ternary Prussian blue analogues; (a) and (e) are Fe-PBA; (b) and (f) are Co-PBA; (c) and (g) are FeCo-PBA; and (d) and (h) are FeCoNi-PBA.

The molecular structure of the ternary Prussian blue analogue FeCoNi-PBA of the present disclosure, and the unary and binary Prussian blue analogues as comparative samples were determined by Fourier transform infrared spectrometer (model: PerkinElmer Frontier). As shown in FIG. 8, the narrow and prominent peak at 2066 cm$^{-1}$ was the vibration of the carbon nitrogen triple bond C≡N, and the peak at 593 cm$^{-1}$ was the vibration of the metal-nitrile group (Metal-CN). Therefore, the results of the FTIR analysis can reconfirm the successful formation of the Prussian blue analogues.

Example 9: Scanning Electron Microscope (SEM) Photographs, Transmission Electron Microscope (TEM) Photographs, and Energy Dispersive X-Ray Imaging (EDS Mapping) Diagram The surface morphology and microstructure of Prussian blue analogue catalysts were observed by using the scanning electron microscope (model: JEOL 6710F). The principle of scanning electron microscope is to emit a high-energy electron beam to the sample surface, the electron beam interacts with the sample to produce different secondary electrons and backscattered electrons, and these electronic signals can be received by the detector to obtain a sample surface morphology image. From the SEM photographs shown in FIG. 9(a) to (h), it can be observed that the unary to ternary Prussian blue analogues were all small particles of less than 150 nanometers (nm), and the small particles agglomerate with each other to form irregular large particles.

In addition, a transmission electron microscope (model: JEOL JEM-2100F) was used to observe the morphology and structure of the ternary Prussian blue analogue catalyst FeCoNi-PBA. The transmission electron microscope injects a high-energy electron beam into the interior of the sample, the electron beam interacts with the interior of the sample to produce different elastically scattered electrons, and these electronic signals are received by the detector to present images of the internal morphology and structure of the sample. The TEM photographs and the reduced fast Fourier transform analysis shown in FIG. 10(a) to (d) showed that the ternary Prussian blue analogue catalyst FeCoNi-PBA of the present disclosure was a nanoscale particle, and was measured to have (400) crystal plane and (422) crystal plane, and (400) crystal plane distance (d-spacing) was 0.253 nm, which coincides with the cubic crystal structure of Prussian blue (JCPDS.52-1907).

Figure 10:
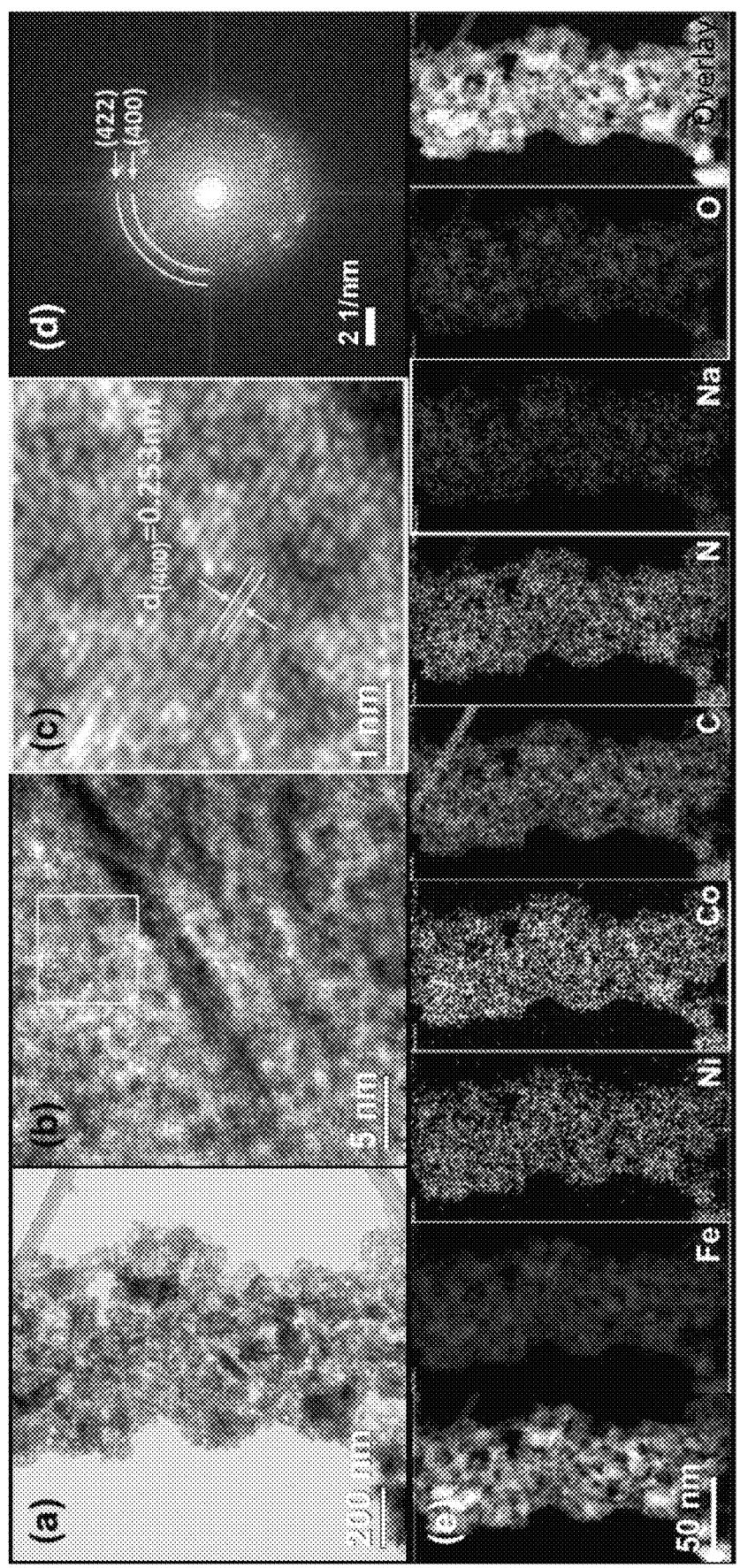
FIGS. 10(a) to (d) are photographs of transmission electron microscope (TEM) of the ternary Prussian blue analogue; (e) is an energy-dispersive X-ray spectroscopy mapping (EDS mapping) image of the ternary Prussian blue analogue. In detail, (a) is a TEM photograph; (b) and (c) are high-resolution TEM (HRTEM) photographs; (d) is a diffraction result obtained by reduced fast Fourier transform (FFT) of the TEM photograph; (e) is energy-dispersive X-ray spectroscopy mapping images.

The energy loss caused by each element is different. TEM/HRTEM was used to collect the X-ray signal emitted by the energy loss, so as to achieve energy-dispersive X-ray spectroscopy mapping, which can provide sample element distribution information. FIG. 10(e) was images of energy-dispersive X-ray spectroscopy mapping for observing the distribution of each elements in the ternary Prussian blue analogue catalyst FeCoNi-PBA of the present disclosure, and it can be seen that Fe, Co, Ni, C, N, Na, O such elements were evenly distributed in the material.

Figure 11B:
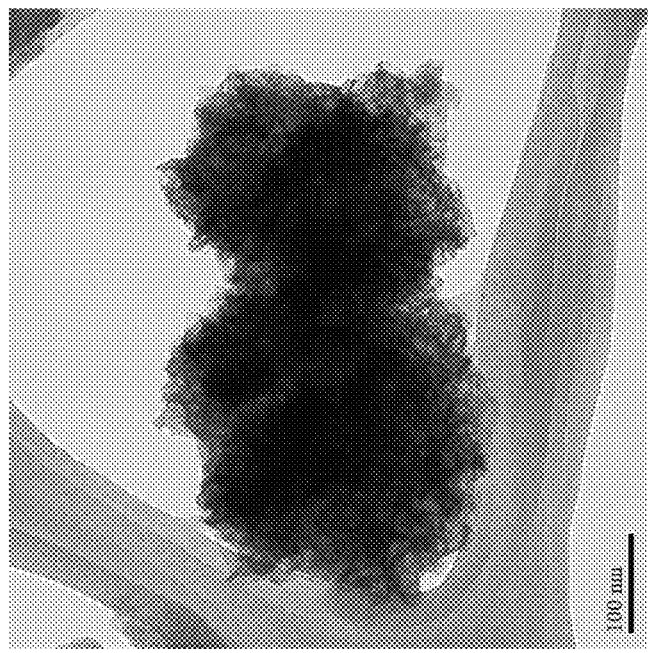
FIG. 11B is a TEM photograph of the ternary Prussian blue analogue after the oxygen evolution reaction.
Figure 11A:
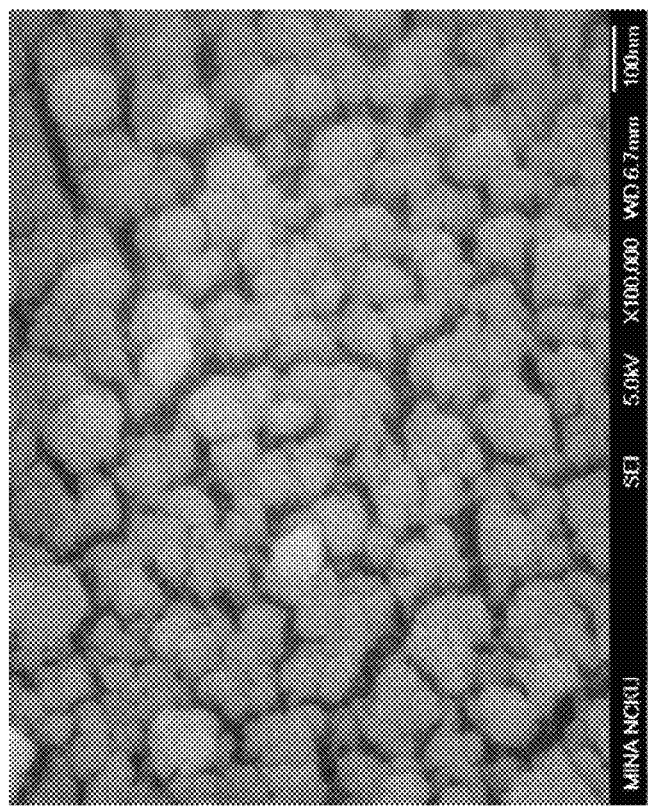
FIG. 11A is a SEM photograph of the ternary Prussian blue analogue after the oxygen evolution reaction.

Example 10: The SEM Photographs, TEM Photographs and EDS Mapping of the Ternary Prussian Blue Analogue Catalyst after Oxygen Evolution Reaction From the SEM photograph shown in FIG. 11A and the TEM photograph shown in FIG. 11B, it can be seen that the morphology of the ternary Prussian blue analogue catalyst FeCoNi-PBA changed after the oxygen evolution reaction, and its appearance resembled cauliflower (cauliflower shape) ○

Figures 12A, 12B, 12C:
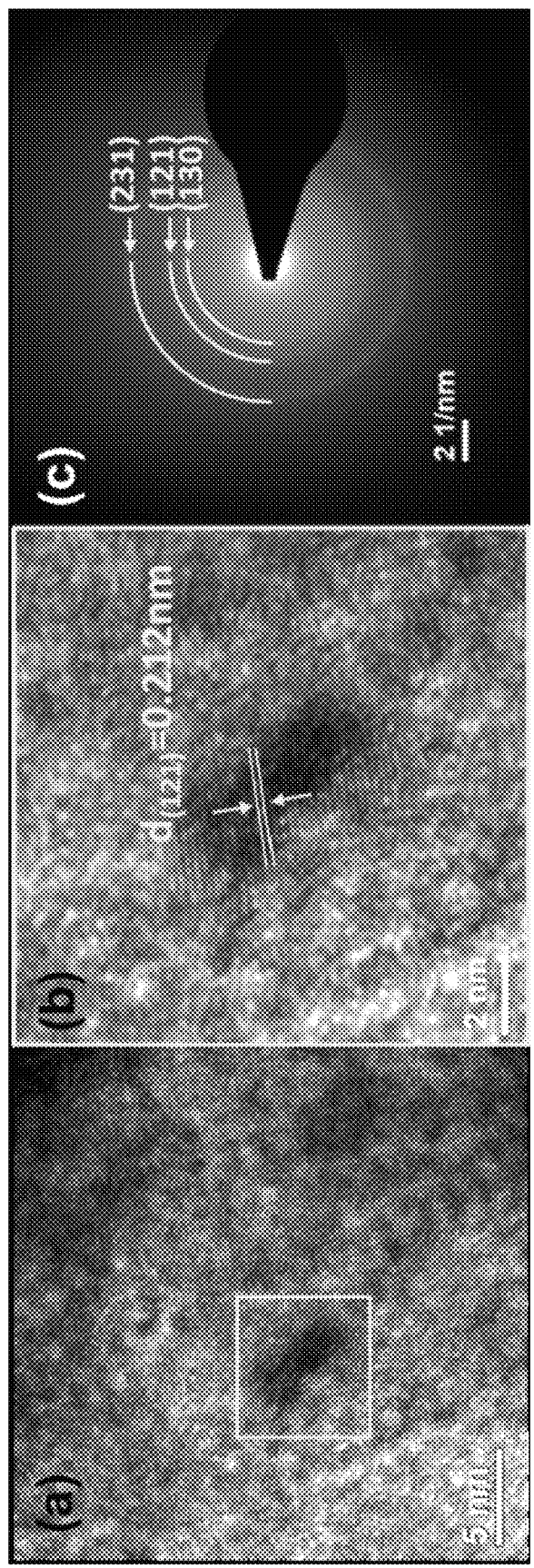
FIGS. 12(a) to (c) are TEM photographs of the ternary Prussian blue analogues after oxygen evolution reaction; (d) is energy-dispersive X-ray spectroscopy mapping images of ternary Prussian blue analogues after oxygen evolution reaction. In detail, (a) and (b) are HRTEM photographs; (c) is a selected area electron diffraction (SAED) image; (d) is an energy-dispersive X-ray spectroscopy mapping images.
Figure 12D:
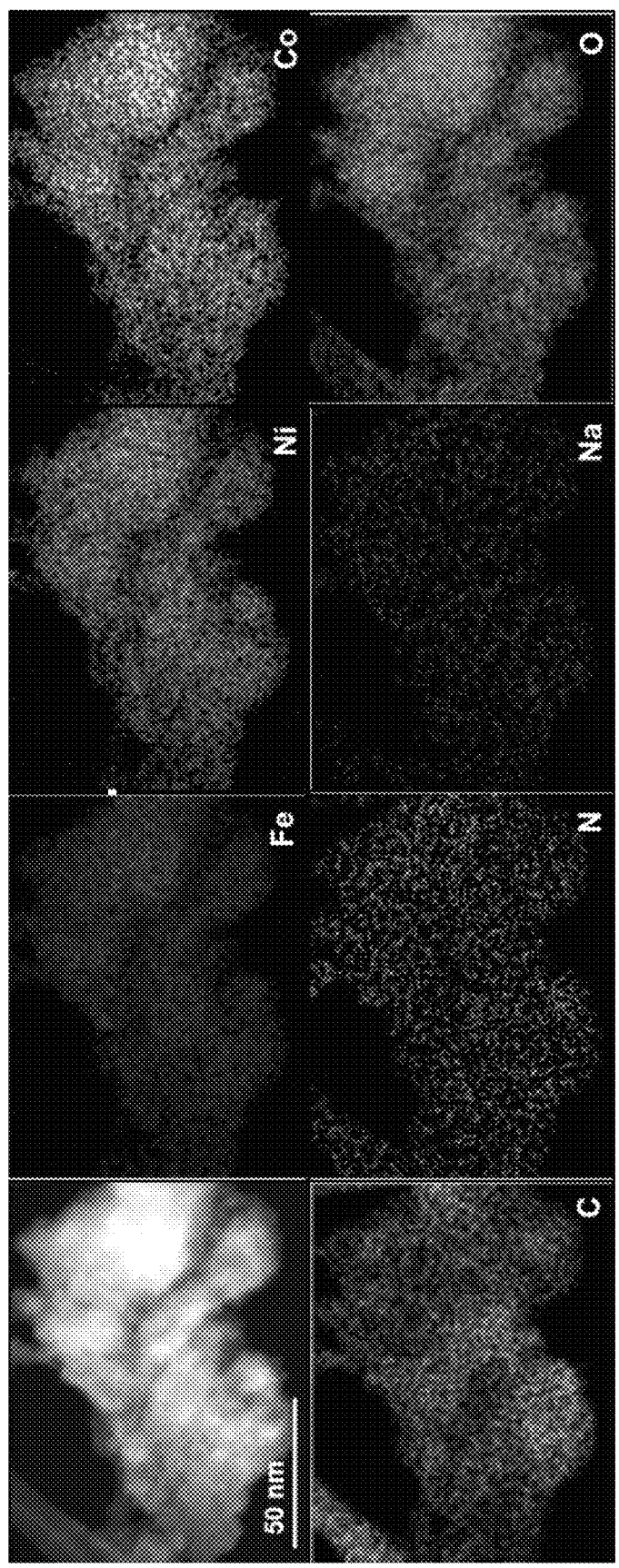
Figure 13A:
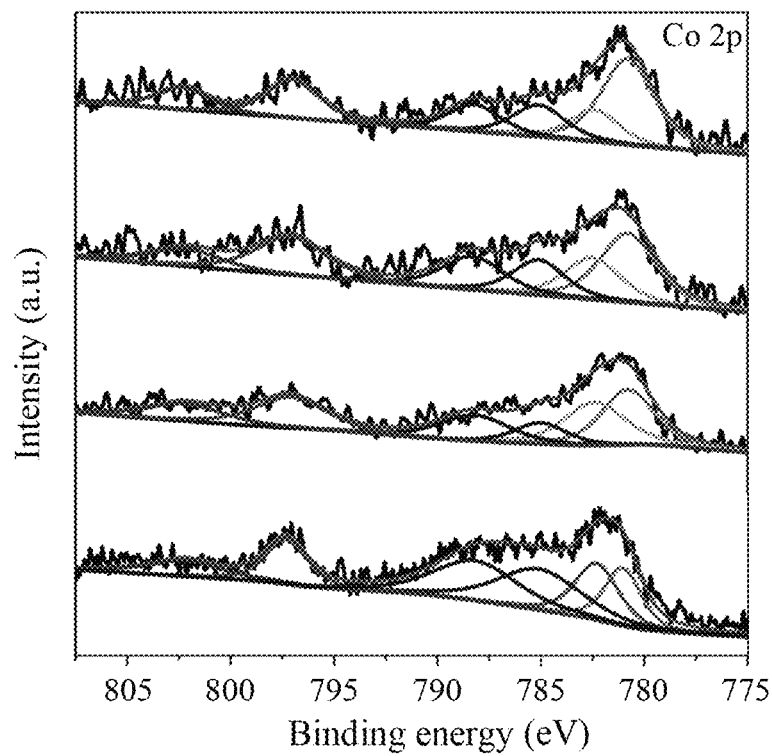
FIGS. 13(a) to (d) are X-ray photoelectron spectroscopy (XPS) spectra of the ternary Prussian blue analogue after oxygen evolution reaction; (a) is Co 2p; (b) is Fe 2p; (c) is Ni 2p; and (d) is O 1s.
Figure 13B:
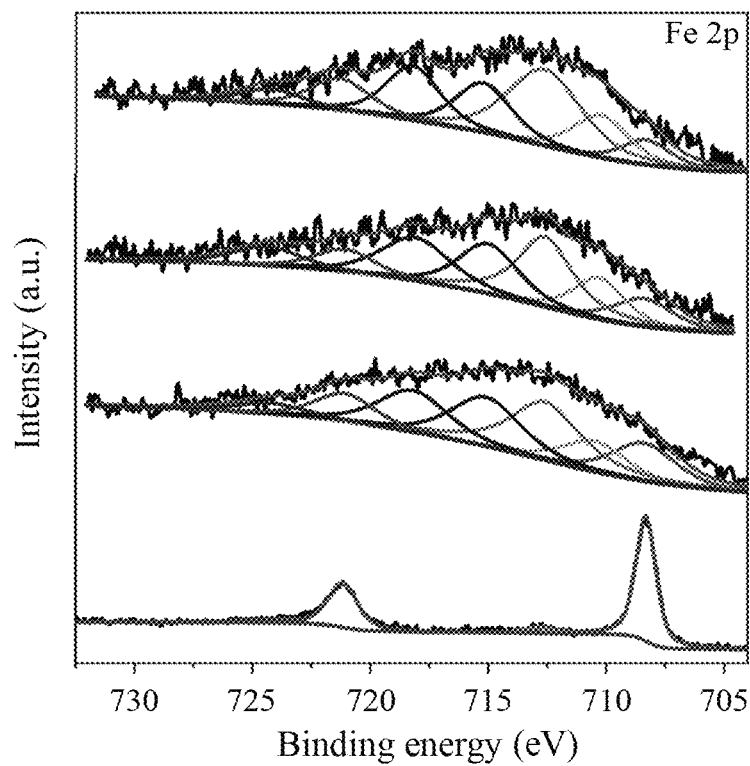
Figure 13C:
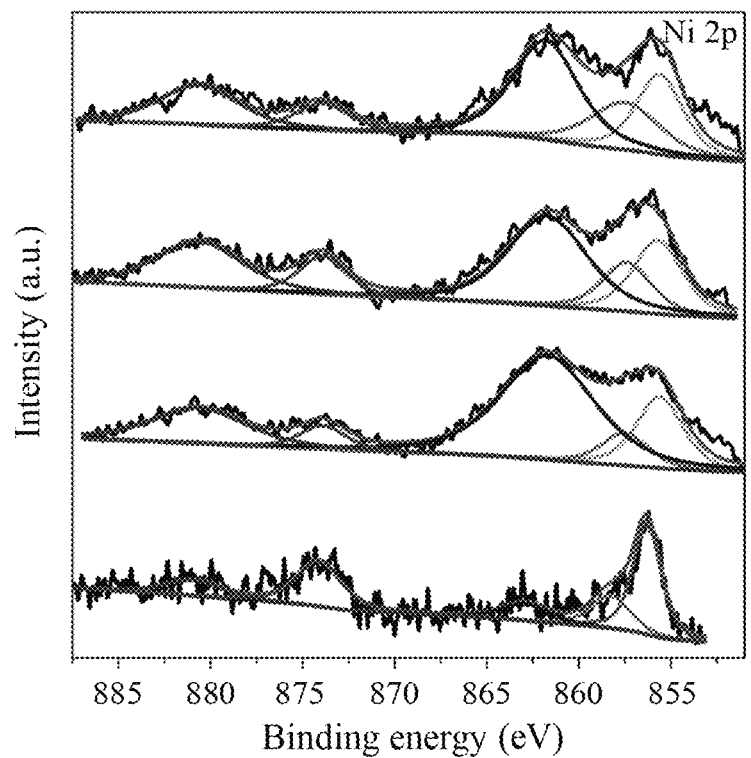
Figure 13D:
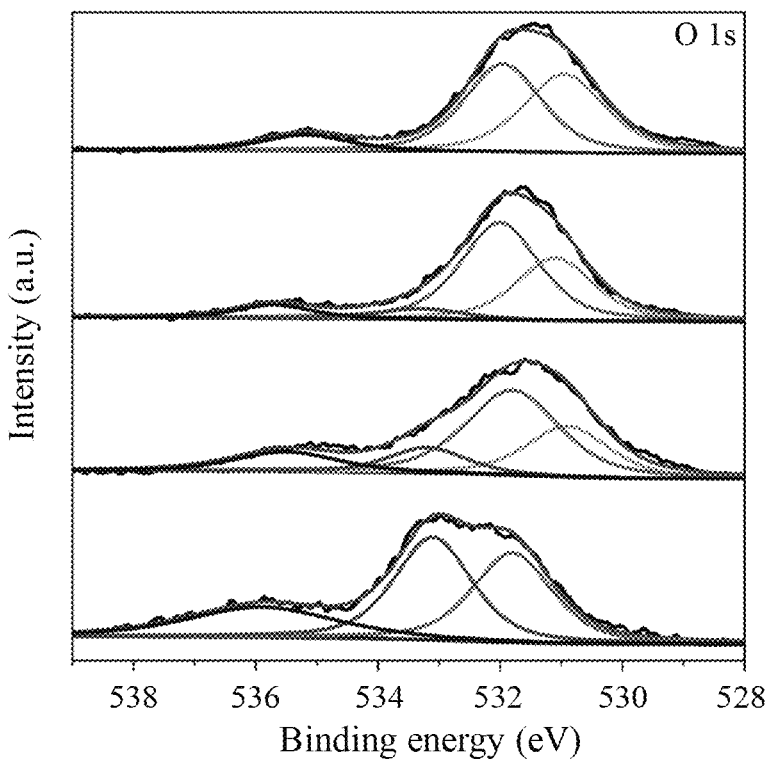
Figure 14A:
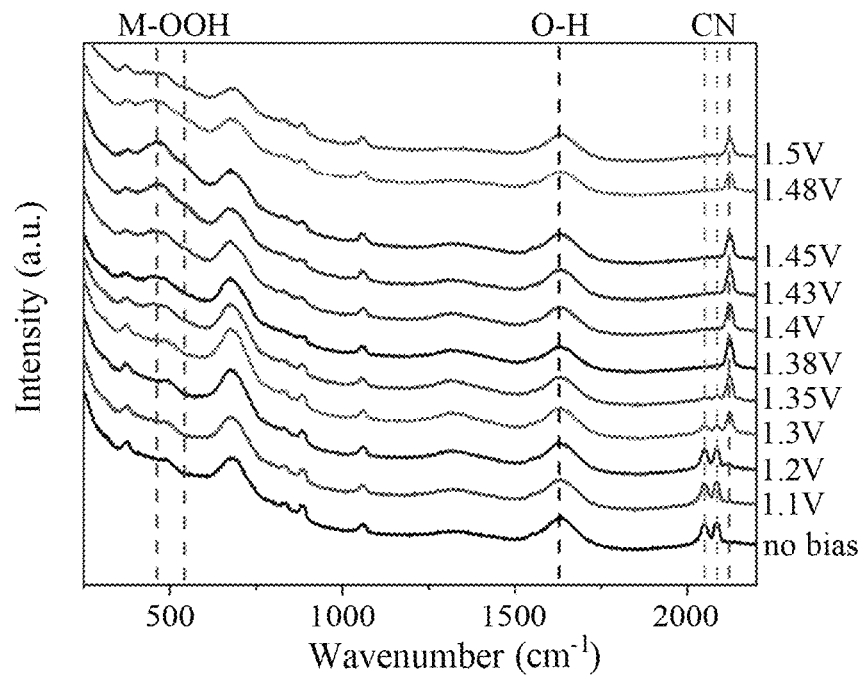
FIGS. 14(a) to (d) are in situ Raman spectra of the ternary Prussian blue analogue; (a) is Fe-PBA; (b) is Co-PBA; (c) is FeCo-PBA; and (d) is FeCoNi-PBA.
Figure 14B:
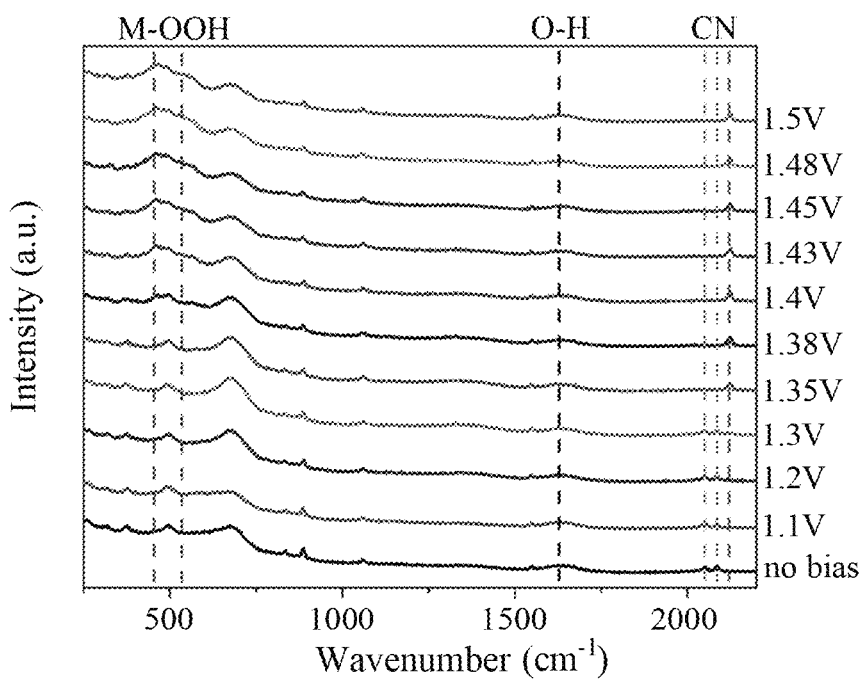
Figure 14C:
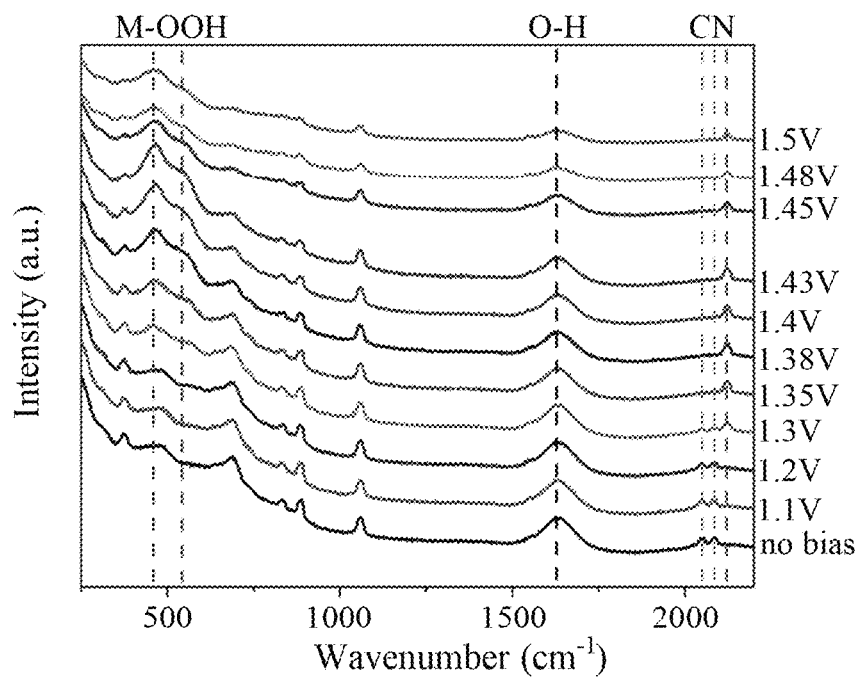
Figure 14D:
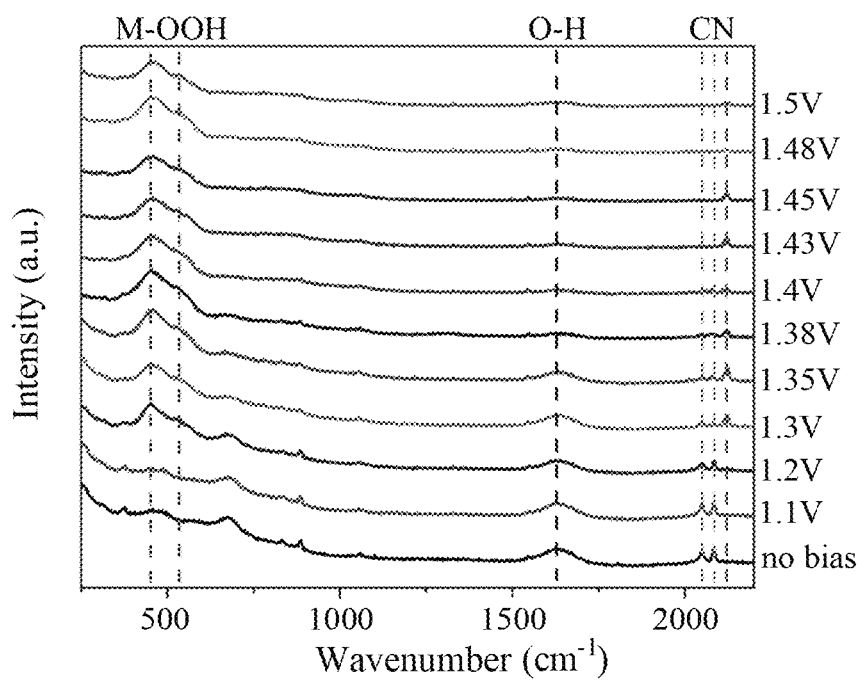

Example 11: The TEM Photographs, Selective Area Electron Diffraction (SAED) and EDS Mapping of the Ternary Prussian Blue Analogue Catalyst after Oxygen Evolution Reaction The microscopic morphology and crystal structure of the ternary Prussian blue analogue catalyst FeCoNi-PBA of the present disclosure were analyzed by high-resolution TEM (HRTEM) and selective area electron diffraction. The (121) crystal plane distance value in FIG. 12(b) was 0.212, which coincided with the characteristic (121) crystal plane of M-OOH, confirming the formation of hydrocarbon based oxides. On the other hand, (130) crystal plane, (121) crystal plane, and (231) crystal plane were observed in the image of selected area electron diffractive shown in FIG. 12(c), further confirming the presence of hydrocarbon based oxides. The EDS mapping shown in FIG. 12(d) also showed that the proportion of nitrogen decreased significantly and the proportion of oxygen increased, indicating that the transition metal at the position of M metal center may react first and form hydrocarbon based oxides.

Example 12: X-Ray Photoelectron Spectroscopy (XPS) of the Ternary Prussian Blue Analogue Catalyst after Oxygen Evolution Reaction XPS is used to analyze the electronic structure of the sample surface, the principle is to irradiate the sample surface with X-rays, then calculate its binding energy by the free photoelectrons emitted from the sample surface, and then the bonding information on the sample surface can be obtained. The present disclosure performed this by using the model Versaprobe PHI 5000, and the XPS spectra were analyzed by the software XPS PEAK41 for its characteristic peaks.

From FIGS. 13(a) to (d), the XPS changes of the ternary Prussian blue analogue catalyst FeCoNi-PBA of the present disclosure at different activation times were observed. With the prolongation of the oxygen evolution reaction time, it was found that the proportion of trivalent form of each element gradually increased (such as Fe, Co, Ni), and the XPS results of O also showed that the M-O peak increased over time, representing the gradual formation of hydrocarbon based oxides. In particular, $Fe^{2+}$ decreased at 708.4 eV but did not completely disappear after 10 hours of reaction, indicating that some $Fe^{2+}$ reacted slowly.

Example 13: In Situ Raman Analysis (In-Situ Raman)

Raman spectroscopy uses a single wavelength as the excitation light, inelastic scattering of molecules occurs after the excitation light incidents samples, then photons and molecules exchange energy, and the frequency of scattered light and the frequency of incident light change, which is called Raman scattering and the difference in frequency is called Raman shift. The magnitude of the shift is related to the vibration mode, and therefore, the structure and bonding of the sample can be observed by Raman shift.

In the in situ Raman spectra shown in FIGS. 16(a) to (d), the ternary Prussian blue analogue catalyst FeCoNi-PBA of the present disclosure presented a MOOH peak at a lower applied potential, indicating that it was rapidly converted to hydrocarbon based oxides to facilitate oxygen production reaction. Also, compared with the unary Prussian blue analogue catalysts Fe-PBA and Co-PBA, and the binary Prussian blue analogue catalyst FeCo-PBA, the larger MOOH peak presented by the ternary Prussian blue analogue catalyst indicated that more hydrocarbon oxides were generated.

The above embodiments are only used to illustrate the principle of the present disclosure and its efficacy, and are not intended to limit the present disclosure. Any person with general knowledge in the related technical field may modify the above embodiments without violating the spirit and scope of the present disclosure. Therefore, the scope of protection of the present disclosure shall be set out in the scope of the patent application.

What is claimed is:

1. A catalyst, comprising a ternary Prussian blue analogue represented by the following Formula (1):

$$A_x M^1_a M^2_b M^3_c [Fe(CN)_6]_{1-y} \quad \text{Formula (1)}$$

wherein A is an alkali metal;
each of $M^1$, $M^2$ and $M^3$ is independently a transition metal, and $M^1$, $M^2$ and $M^3$ are different from each other;
$0<x\leq2$;
$0<y\leq1$ and
a, b, and c are $>0$, and $a+b+c=1$,
wherein the catalyst is in a crystalline form of a cubic crystal system.

2. The catalyst of claim 1, wherein each of the $M^1$, $M^2$ and $M^3$ of the ternary Prussian blue analogue is independently selected from a group consisting of Sc, Ti, V, Cr, Mn, Fe, Co, Ni, Cu, Zn, Y, Zr, Nb, Mo, Tc, Ru, Rh, Pd, Ag, and Cd.

3. The catalyst of claim 2, wherein each of the $M^1$, $M^2$ and $M^3$ of the ternary Prussian blue analogue is independently selected from a group consisting of Fe, V, Cr, Co, and Ni.

4. The catalyst of claim 3, wherein the $M^1$, $M^2$ and $M^3$ of the ternary Prussian blue analogue are a combination of Fe, Co and Ni, a combination of Fe, Cr and Ni, or a combination of Fe, V and Ni.

5. The catalyst of claim 1, wherein a mole ratio of the $M^1$, $M^2$ and $M^3$ of the ternary Prussian blue analogue is 1:1:0.2 to 5.

6. The catalyst of claim 1, wherein the A of the ternary Prussian blue analogue is Na or K.

7. The catalyst of claim 1, which is granular and has a particle size of 5 to 150 nm.

8. The catalyst of claim 1, which is used as a catalyst for the oxygen evolution reaction.

9. The catalyst of claim 8, which in the oxygen evolution reaction has an overpotential of 250 mV or less at a current density of 10 $mA/cm^2$, and has an overpotential of 300 mV or less at a current density of 100 $mA/cm^2$.

10. The catalyst of claim 8, which in the oxygen evolution reaction has an overpotential of 240 mV or less at a current density of 10 $mA/cm^2$, and has an overpotential of 290 mV or less at a current density of 100 $mA/cm^2$.

11. The catalyst of claim 8, which in the oxygen evolution reaction has a durability of 75 hours or more at a current density of 10 $mA/cm^2$.

12. The catalyst of claim 8, which in the oxygen evolution reaction has a durability of 75 hours or more at a current density of 100 $mA/cm^2$.

13. The catalyst of claim 8, which in the oxygen evolution reaction has a Tafel slope of 45 mV/dec or less.

14. The catalyst of claim 8, which in the oxygen evolution reaction has an electrochemical active surface area (ECSA) of 1.18 $mF/cm^2$ or more.

15. A method for preparing the catalyst of claim 1, comprising the following steps:
(a) dissolving the sulfate of each the transition metals in water to form a first solution;
(b) dissolving ferrocyanide of the alkali metal in water to form a second solution;
(c) dissolving an alkali metal salt and a dispersant in water to form a third solution;
(d) adding the first solution and the second solution to the third solution, and then stirring and mixing;
(e) standing for precipitation; and
(f) drying the precipitate to obtain the catalyst.

16. The method of claim 15, wherein each of the first solution and the second solution is added to the third solution in batches.

17. The method of claim 15, wherein when the standing for precipitation of the step (e) is performed, the third solution to which the first solution and the second solution are added is shielded from light.

18. The method of claim 15, wherein the step (a) to the step (e) are performed at 15 to 25° C.

19. The method of claim 15, further comprising:
(g) between the step (e) and the step (f), centrifuging the precipitate with water and alcohol to remove impurities.

* * * * *